United States Patent
Gazda et al.

(10) Patent No.: US 6,453,470 B1
(45) Date of Patent: Sep. 17, 2002

(54) DYNAMIC DETECTION OF HARDWARE CONFIGURATION IN A DIGITAL TERMINAL

(75) Inventors: Robert Gazda, Wayne; David A. Prezuhy, Chalfont; Jack M. Birnbaum, Southampton; Rocky C. Torsitano, Ambler; Chris Del Sordo, Souderton, all of PA (US)

(73) Assignee: General Instruments Corporation, Horsham, PA (US)

( * ) Notice: Subject to any disclaimer, the term of this patent is extended or adjusted under 35 U.S.C. 154(b) by 0 days.

(21) Appl. No.: 09/410,010

(22) Filed: Sep. 30, 1999

(51) Int. Cl.[7] .............................................. G06F 9/445
(52) U.S. Cl. ...................................... 717/174; 713/100
(58) Field of Search ........... 717/11, 174; 370/254–258; 709/220–222; 710/8–14; 713/100

(56) References Cited

U.S. PATENT DOCUMENTS

| | | | | |
|---|---|---|---|---|
| 5,325,532 A | * | 6/1994 | Crosswy et al. ................ | 713/2 |
| 5,359,730 A | * | 10/1994 | Marron ......................... | 717/169 |
| 5,623,604 A | * | 4/1997 | Russell et al. ................ | 717/167 |
| 5,696,970 A | * | 12/1997 | Sandage et al. ............. | 709/301 |
| 5,742,829 A | * | 4/1998 | Davis et al. .................. | 717/179 |
| 5,794,032 A | * | 8/1998 | Leyda ............................ | 713/2 |
| 5,812,857 A | * | 9/1998 | Nelson et al. ................ | 717/173 |
| 5,826,090 A | * | 10/1998 | Mealey et al. ............... | 717/162 |
| 5,951,639 A | | 9/1999 | MacInnis ...................... | 709/217 |
| 5,953,010 A | * | 9/1999 | Kampe et al. ................ | 345/348 |
| 6,023,585 A | * | 2/2000 | Perlman et al. .............. | 717/173 |

FOREIGN PATENT DOCUMENTS

| | | | | | |
|---|---|---|---|---|---|
| JP | 02-212910 | * | 8/1990 | .............. | G06F/1/00 |
| JP | 09-250954 | * | 9/1994 | ........... | G06F/13/14 |
| JP | 11-234340 | * | 8/1999 | ........... | H04L/12/56 |

* cited by examiner

*Primary Examiner*—Gregory Morse
*Assistant Examiner*—John Q. Chavis
(74) *Attorney, Agent, or Firm*—Barry R. Lipsitz; Douglas M. McAllister

(57) ABSTRACT

A method and apparatus for detecting a hardware configuration in a digital terminal, and, in response, selecting a corresponding executable software path for initializing the hardware. All terminals in a digital communication network, such as a television network, are provided with a single common set-top firmware/software object that contains all software components required to run on all hardware platforms. The total amount of software needed at the terminals is reduced over prior art schemes since the common software object includes software that is common to the different hardware component types only once, instead of providing a different object for each hardware type which results in duplication of the common software. The software from the software object can execute on platforms with different hardware components and circuits. This provides freedom to the network operator to select terminals with reduced cost components, e.g., from different manufacturers. Additionally, the system avoids the need to provide different software to the terminals based on their hardware platform type.

16 Claims, 2 Drawing Sheets

DYNAMIC DETECTION OF HARDWARE CONFIGURATION IN A DIGITAL TERMINAL

BACKGROUND OF THE INVENTION

The present invention relates to a method and apparatus for detecting a hardware configuration in a digital terminal, such as a set-top television terminal used for receiving digital video and other data in a subscriber network, and, in response, selecting a corresponding executable software path, e.g., to initialize the hardware.

The recent advent of digital set-top terminals has spurred the growth of subscriber television networks, such as cable/satellite television networks. Such terminals can support increased levels of programming services and a variety of software-based applications/functions, such as an electronic program guide, stock or weather banners, shop and bank at home services, games, and the like. Moreover, this trend is expected to continue with the convergence of telephone, television and computer networks, and the rise of in-home computer networks.

However, it is difficult to maintain compatibility between the software and the hardware of the different terminals in a network. For example, different terminals in one network may have hardware from different manufacturers, or different component versions from the same manufacturer.

The hardware may include, for example, tuners, demodulators, MPEG-2 Decoders (e.g., Audio, Video, and Data), Video Encoders, Audio Mixers, and so forth.

Generally, continual hardware changes in set-top terminals is a result of improvements, cost reductions, new components, and second source manufacturers.

Hardware changes force the development of separate software executables (e.g., software objects) for the different hardware components. A software object is a single software executable. Conventionally, each hardware component type requires its own object or executable.

This is problematic since it creates confusion and requires additional record keeping to maintain a history of the status of each terminal in a network.

Additionally, updated software must be provided to the terminals, which leads to additional expense and record keeping requirements for the network provider. Commonly, the software can be downloaded to specific terminals in download messages. However, this process consumes the limited bandwidth in the network. Delivery of the software via other means, such as local installation via a smart card, is similarly burdensome.

For example, if ten hardware platforms exist in a cable television system, ten corresponding objects would need to be downloaded, one for each platform.

Moreover, these problem are compounded by the continual upgrading and replacement of terminals in a network as technology advances.

Accordingly, it would be desirable to provide a system for dynamically detecting hardware configuration information in a digital television terminal. In response to this information, the system should select software components from a single executable platform firmware, which includes all software necessary to run the terminal's platform.

In particular, the system should provide a single set-top firmware/software object that contains all software components required to run on all hardware platforms in a network. The software should decide which components to use based on the hardware configuration.

The system should store the hardware configuration information in a manner that avoids corruption.

The system should reduce the burden in managing software executables in a subscriber television network.

The system should reduce the amount of bandwidth required to deliver software to terminals in a communication network.

The detection of the hardware configuration information should be initiated in response to any desired pre-condition, e.g., such as when the terminal is initialized (e.g., powered on or reset), in response to a signal from the network's headend, or periodically, according to a clock signal at the terminal.

The system should be compatible with networks that communicate digital video, audio and other data to subscriber terminals.

The present invention provides a system having the above and other advantages.

SUMMARY OF THE INVENTION

The present invention relates to a method and apparatus for detecting a hardware configuration in a digital terminal, and, in response, selecting a corresponding executable software path, e.g., for initializing the hardware.

In a particular embodiment, a method is presented for initializing a hardware component in a digital terminal. The terminal can be a television terminal or computer terminal, for example. The method includes the step of reading data from a memory of the terminal that provides identifying information regarding at least one hardware component of the terminal. An executable software path is selected from a plurality of available executable software paths according to the identifying information. Additionally, the selected executable software path is executed at a processor of the terminal to initialize the hardware component.

The identifying information may be, e.g., a manufacturer and/or model number of the hardware component. Moreover, the hardware component may be a tuner, demodulator, decoder, encoder, or mixer, for example.

Preferably, the plurality of available executable software paths are provided for a corresponding plurality of types of hardware components using a common software object. The common software object includes software that is common to different types of hardware components, and software that is specific to each of the different types of hardware components.

Advantageously, the total amount of software needed at the terminals is reduced over prior art schemes since the common software object includes software that is common to the different hardware component types only once, instead of providing a different object for each hardware component type which results in duplication of the common software.

A corresponding apparatus is also disclosed.

A method is also presented for initializing hardware components in a plurality of digital television terminals in a digital television network, where the terminals have different respective types of hardware components. The method includes the step of: providing data in respective memories of the terminals that provides identifying information regarding at least one hardware component type of each respective terminal. A common software object is provided to the terminals that contains a plurality of different executable software paths corresponding to the different hardware component types.

DETAILED DESCRIPTION OF THE INVENTION

The present invention relates to a method and apparatus for detecting a hardware configuration in a digital terminal, and, in response, selecting a corresponding executable software path.

In accordance with the invention, manufacturer, model and other hardware-specific information is provided in a non-volatile, write-protected area of memory. This information is accessed during initialization of the terminal hardware platform, e.g., during terminal power on or reset. The information is used to select software that is required to control and initialize specific pieces of hardware.

By detecting hardware-specific information during terminal initialization, the software is able to execute on platforms with different hardware components and circuits. This provides freedom to the network operator to select terminals with reduced cost components, e.g., from different manufacturers.

Manufacturer, model number and other hardware component information is stored in protected memory in the terminal. The memory is preferably non-volatile and write-protected by hardware to prevent corruption. For example, an Electrically Erasable Programmable Read-Only Memory (EEPROM) storage device with an Inter-Integrated Circuit ($I^2C$) bus interface, and a protected sector of flash may be used. An $I^2C$ bus is used to connect integrated circuits (ICs). It is a multi-master bus, which means multiple chips can be connected to the same bus, and each one can act as a master by initiating a data transfer.

A provision for storing 128 bytes of hardware-identifying data is believed to be sufficient for most situations, although more or less space can be allocated as required.

A device driver can be used that has the ability to read the contents of a non-volatile protected memory.

Portions of the memory are read during initialization. The contents of the memory are then used to select software components (e.g., paths of execution). For example, there may be a number of tuners that can be used on a given terminal platform. The V860D and V860DL, manufactured by General Instrument Corporation, the assignee hereof, are two examples of tuner models. During startup, the tuner type is read from the memory. A corresponding software path is executed based on the determined tuner type to initialize the tuner.

Moreover, both tuner paths are located in a single software object. If more than two paths are present, they are all preferably located in a single software object. Therefore, this single, common software object can run on different platforms that have the different tuner types.

Information included in non-volatile memory ensures that downloaded executables will run on the platform.

Figure 1:
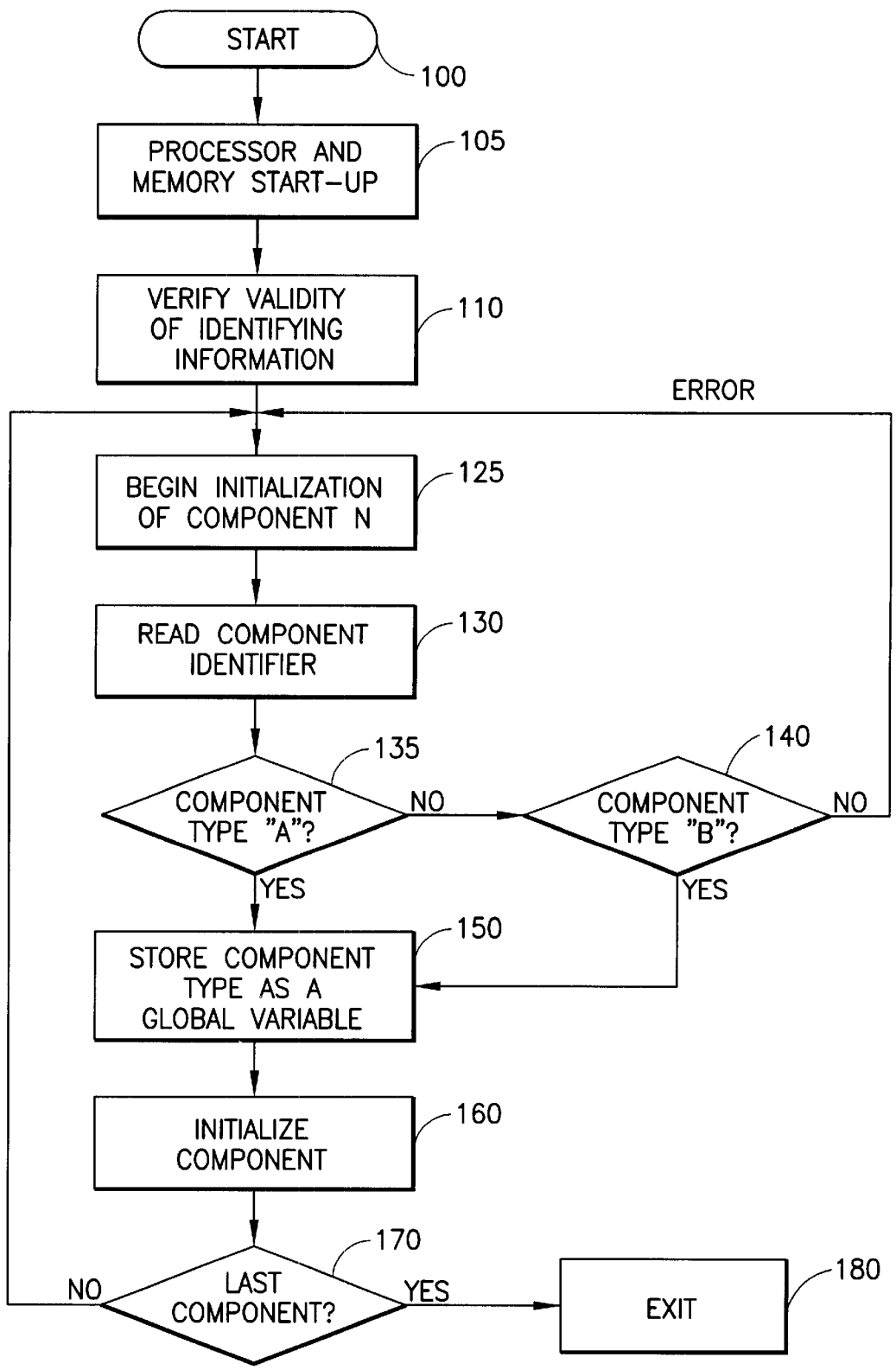
FIG. 1 illustrates a method for detecting hardware configuration information in a digital terminal, and selecting corresponding software, in accordance with the present invention.

FIG. 1 illustrates a method for detecting hardware configuration information in a digital terminal, and selecting corresponding software, in accordance with the present invention.

The method begins at block 100. At block 105, processor and memory startup occur. At block 110, the validity of the hardware configuration information is verified, e.g., using a known checksum procedure. At blocks 125–170, platform hardware is initialized. Specifically, at block 125, the initialization of the first of "n" hardware components in the terminal begins. One or more components can be initialized.

At block 130, component-identifying data (e.g., hardware-specific information) is read from memory for the current component.

At block 135, if the component is a first type (e.g., type "A"), the corresponding information is stored as a global variable (block 150). The term "global" is used to describe variables that are in scope for any external module that requires access to it. For example, if the tuner type is required by a separate module, storing it as a global when the type is dynamically determined will allow the other module to use the variable by declaring it as external.

At block 140, if the component is a second type (e.g., type "B"), the corresponding information is stored as a global variable (block 150). The method can account for any number of different component types. Moreover, some components may have only one component type. If the component type that is read does not correspond to any known component type, an error has occurred, and anther attempt to read the component may occur.

At block 160, the component is initialized using the corresponding software path for the component type.

If the current component is not the last component to be initialized, processing continues at block 125 for the next component. If no further components are to be initialized, and exit path is taken (block 180).

Figure 2:
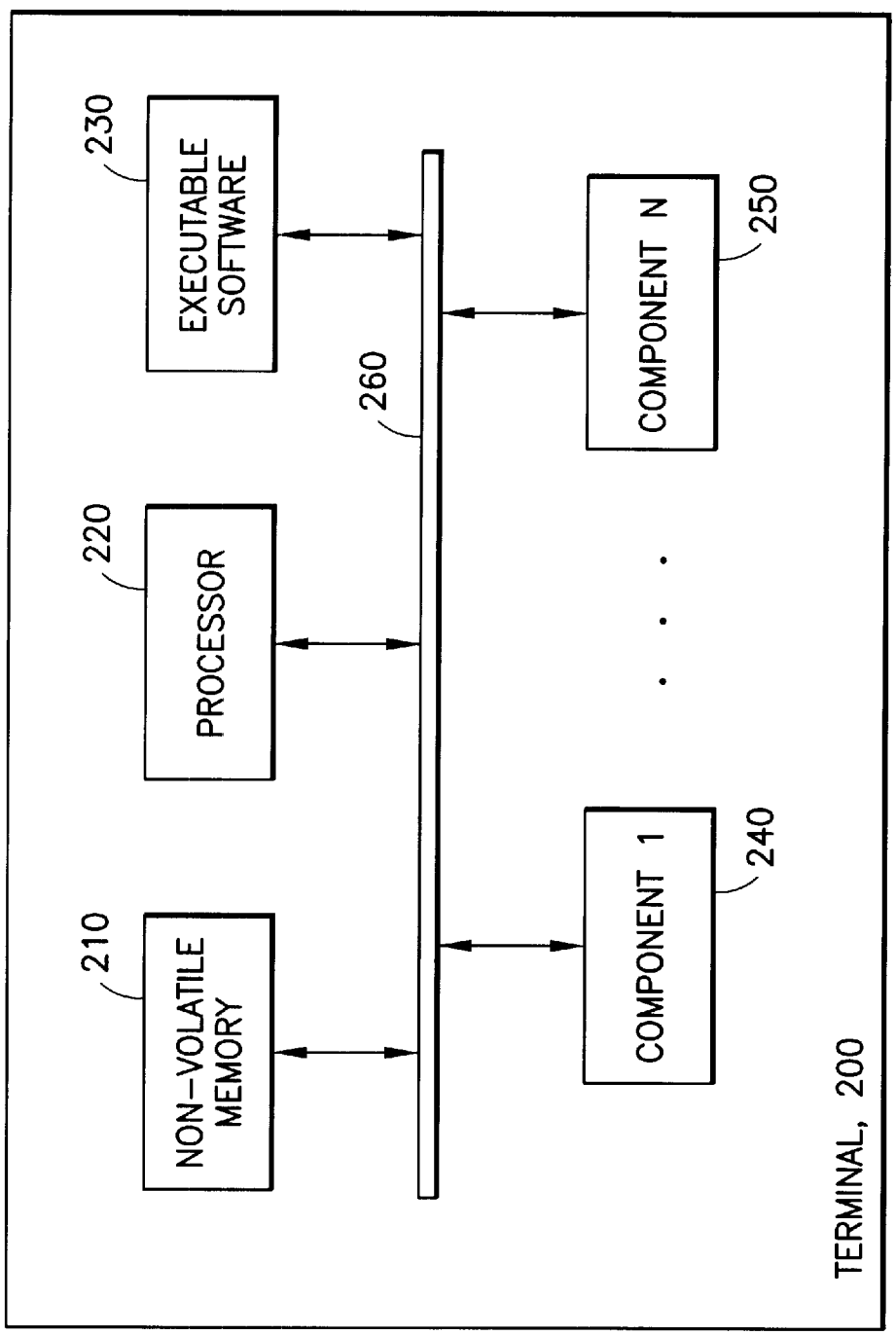
FIG. 2 illustrates a digital terminal that detects hardware configuration information and selects corresponding software in accordance with the present invention.

FIG. 2 illustrates a digital terminal that detects hardware configuration information and selects corresponding software in accordance with the present invention.

The terminal 200, shown in a simplified form, includes a bus 260, such as an $I^2C$ bus, a non-volatile memory 210 (such as EEPROM), a processor 220, an executable software function 230, and any number of components, represented by component 1 (240), . . . , component n (250). Information can be exchanged between the various functions via the bus 260.

Generally, the processor can query the component 240, . . . , 250 to obtain the hardware-specific information, and transfer this information for storage in the memory 210. Upon initialization of the terminal, the processor reads the information from the memory 210 and provides it to the executable software function 230 to choose the corresponding software path, e.g., for initializing the component.

Accordingly, it can be seen that the present invention provides a method and apparatus for detecting a hardware configuration in a digital terminal, and, in response, selecting a corresponding executable software path. In particular, the invention provides all terminals with a single, common set-top firmware/software object that contains all software components required to run on all hardware platforms. Specific details for providing such an object are believed to be within the purview of those skilled in the art in view of the present disclosure. Moreover, any suitable object-oriented programming language may be used.

The total amount of software needed at the terminals is reduced over prior art schemes since the common software object includes software that is common to the different hardware component types only once, instead of providing a different object for each hardware type which results in duplication of the common software.

The invention allows software from a common software object at a digital television terminal to execute on platforms with different hardware components and circuits. This provides freedom to the network operator to select terminals with reduced cost components, e.g., from different manufacturers.

The techniques of the present invention may be implemented using any known hardware, software and/or firmware.

Although the invention has been described in connection with various specific embodiments, those skilled in the art will appreciate that numerous adaptations and modifications may be made thereto without departing from the spirit and scope of the invention as set forth in the claims.

For example, while the invention was discussed in connection with terminals for cable or satellite television broadband communication networks, it will be appreciated that other networks such as local area networks (LANs), metropolitan area networks (MANs), wide area networks (WANs), internets, intranets, and the Internet, or combinations thereof, may be used.

What is claimed is:

1. A method for initializing a hardware component in a digital terminal in a communication network, comprising the steps of:

providing a common software object to the terminal, said common software object containing a plurality of different executable software paths corresponding to a plurality of different hardware component types;

reading data from a memory of the terminal to obtain identifying information regarding at least one hardware component of the terminal;

selecting an executable software path from the plurality of executable software paths according to the identifying information; and executing the selected executable software path at a processor of the terminal to initialize the corresponding hardware component.

2. The method of claim 1, wherein:

the identifying information comprises at least one of a manufacturer and a model of the hardware component.

3. The method of claim 1, wherein:

the terminal is a television terminal.

4. The method of claim 1, wherein:

the hardware component comprises one of a tuner, demodulator, decoder, encoder, and mixer.

5. The method of claim 1, wherein:

the common software object includes software that is common to the different types of hardware components, and software that is specific to each of the different types of hardware components.

6. A method for initializing hardware components in a plurality of digital terminals in a communication network, wherein the terminals have different respective types of hardware components, comprising the steps of:

providing data in respective memories of the terminals that provides identifying information regarding at least one hardware component type of each respective terminal; and providing a common software object to the terminals, said common software object containing a plurality of different executable software paths corresponding to the different hardware component types;

wherein the terminals are adapted to read their respective memories to obtain the identifying information thereof, select one of the different executable software paths according to the identifying information, and execute the selected executable software path at a respective processor of the terminal to initialize the hardware component thereof.

7. The method of claim 6, wherein:

the common software object includes software that is common to the different types of hardware components, and software that is specific to each of the different types of hardware components.

8. The method of claim 6, wherein:

the identifying information comprises at least one of a manufacturer and a model of the hardware component.

9. The method of claim 6, wherein:

the terminal is a television terminal.

10. The method of claim 6, wherein:

the hardware component comprises one of a tuner, demodulator, decoder, encoder, and mixer.

11. A digital terminal for a communication network, comprising:

a memory for storing data that provides identifying information regarding at least one hardware component of the terminal;

means for reading the data from the memory to obtain the identifying information;

means for selecting an executable software path from a plurality of available executable software paths according to the identifying information; and means for executing the selected executable software path to initialize the hardware component;

wherein the plurality of different executable software paths are provided for a corresponding plurality of different types of hardware components using a common software object.

12. The terminal of claim 11, wherein:

the identifying information comprises at least one of a manufacturer and a model of the hardware component.

13. The terminal of claim 11, wherein:

the terminal is a television terminal.

14. The terminal of claim 11, wherein:

the hardware component comprises one of a tuner, demodulator, decoder, encoder, and mixer.

15. The terminal of claim 11, wherein:

the common software object includes software that is common to the different types of hardware components, and software that is specific to each of the different types of hardware components.

16. The terminal of claim 11, wherein:

the memory comprises a non-volatile memory.

* * * * *